US009251561B2

United States Patent
Furumura et al.

(10) Patent No.: US 9,251,561 B2
(45) Date of Patent: Feb. 2, 2016

(54) APPARATUS AND METHOD FOR DISPLAYING PANORAMIC IMAGES

(75) Inventors: Kyoko Furumura, Tokyo (JP); Takeshi Yamagishi, Tokyo (JP); Shinichi Hirata, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 900 days.

(21) Appl. No.: 13/392,002

(22) PCT Filed: May 19, 2010

(86) PCT No.: PCT/JP2010/003362
§ 371 (c)(1),
(2), (4) Date: Apr. 23, 2012

(87) PCT Pub. No.: WO2011/039904
PCT Pub. Date: Apr. 7, 2011

(65) Prior Publication Data
US 2012/0200665 A1   Aug. 9, 2012

(30) Foreign Application Priority Data
Sep. 29, 2009  (JP) ................................. 2009-225305

(51) Int. Cl.
*H04N 7/00* (2011.01)
*G06T 3/00* (2006.01)
(52) U.S. Cl.
CPC .................... *G06T 3/0062* (2013.01)
(58) Field of Classification Search
CPC ................................................ G06T 3/0062
USPC ..................................................... 348/36, 118
See application file for complete search history.

(56) References Cited

U.S. PATENT DOCUMENTS

| 8,487,957 B1* | 7/2013 | Bailly et al. .................. 345/619 |
| 2008/0079808 A1* | 4/2008 | Ashlock et al. ............... 348/118 |
| 2008/0291217 A1* | 11/2008 | Vincent et al. ................ 345/629 |

FOREIGN PATENT DOCUMENTS

| JP | 2001229397 A | 8/2001 |
| JP | 2002152637 A | 5/2002 |

(Continued)

OTHER PUBLICATIONS

Office Action issued for corresponding Chinese Patent Application No. 201080037432, dated Nov. 5, 2013.

(Continued)

*Primary Examiner* — Tung Vo
*Assistant Examiner* — Rowina Cattungal
(74) *Attorney, Agent, or Firm* — Matthew B. Dernier, Esq.

(57) ABSTRACT

When there is a shooting location of another panoramic image in a shooting direction of a panoramic image to be displayed, a marker setting unit associates a marker, indicating the presence of the another panoramic image in the shooting direction, with the panoramic image to be displayed. A mapping processing unit maps the panoramic image to be displayed, which has been associated with markers for the other panoramic images, into a three-dimensional (3D) panoramic space as textures. A 3D image generator generates a 3D panoramic image when the 3D panoramic space is viewed in a specified line of sight, with the shooting location of the panoramic image to be displayed being set as a viewpoint position. An interface receives an instruction from a user concerning the displayed 3D panoramic image.

13 Claims, 13 Drawing Sheets

(56) References Cited

FOREIGN PATENT DOCUMENTS

| JP | 2004325459 | A | 11/2004 |
|----|------------|---|---------|
| JP | 2005327314 | A | 11/2005 |
| JP | 2007110675 | A | 4/2007 |
| JP | 2009093294 | A | 4/2009 |
| WO | 2008147561 | A2 | 12/2008 |
| WO | 2009112088 | A1 | 9/2009 |

OTHER PUBLICATIONS

International Search Report for corresponding PCT Application PCT/JP2010/003362, dated Jun. 22, 2012.

International Preliminary Report on Patentability and Written Opinion for corresponding PCT Application PCT/JP2010/003362, dated Jun. 22, 2012.

Shun Ikeda et al., "Panorama Gazo o Mochiita Kaso Kukan Kochiku" DEWS2006 Ronbunshu [online], The Institute of Electronics, Information and Communication Engineers Data Kogaku Kenkya Senmon Iinkai, Internet<URL: http://www.ieice.org/iss/de/DEWS/DEWS2006/doc/4B-i12.pdf> pp. 1-8 provided, Jun. 30, 2006 (See translated Abstract for relevance).

Office Action issued for corresponding Japanese Patent Application No. 2009-225305, dated May 28, 2013.

Office Action issued for corresponding Japanese Patent Application No. 2013-259024, dated Sep. 24, 2014.

Office Action issued for corresponding Japanese Patent Application No. 2009-225305, dated Sep. 17, 2013.

Office Action issued for corresponding Japanese Patent Application No. 2015-029664, 4 pages, dated Nov. 4, 2015.

* cited by examiner

360

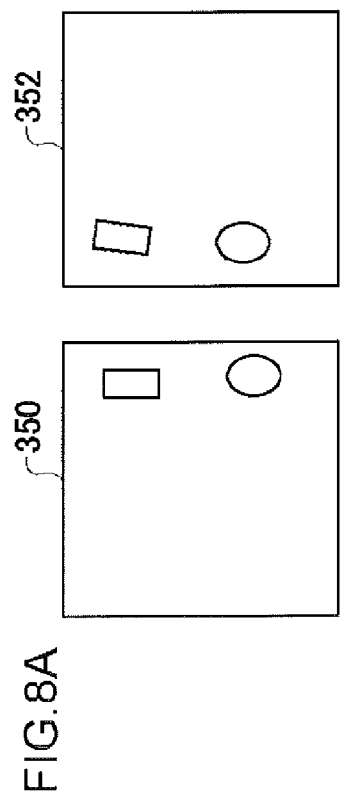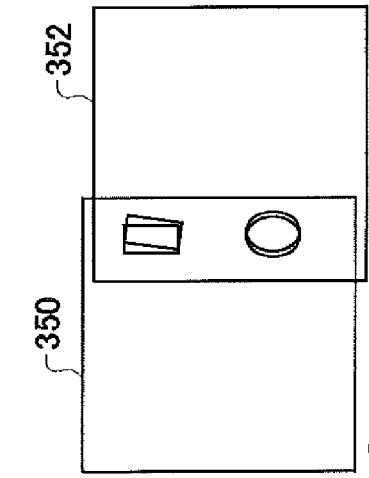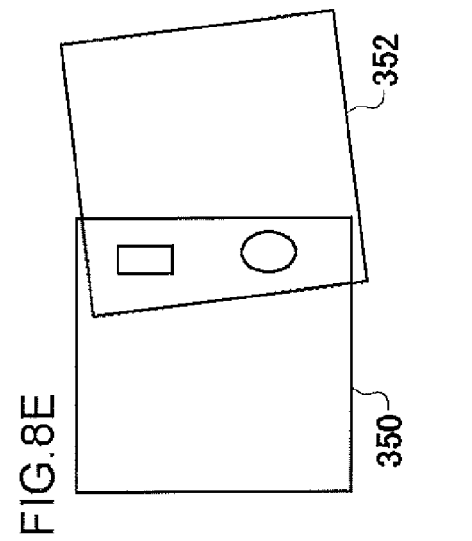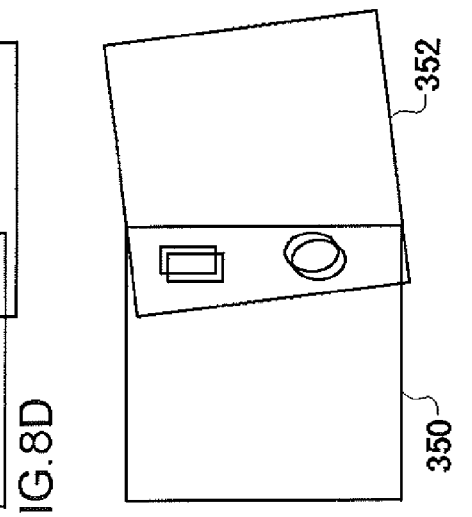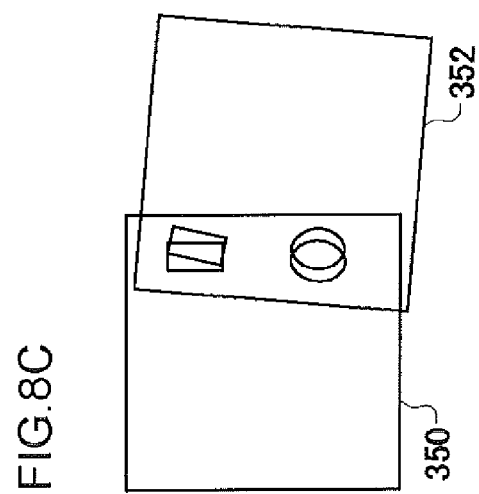

APPARATUS AND METHOD FOR DISPLAYING PANORAMIC IMAGES

TECHNICAL FIELD

The present invention relates to an apparatus and a method for displaying panoramic images.

BACKGROUND ART

With the prevalence of digital still cameras and digital video cameras, there are increased occasions where still images or moving images having been shot are stored in a computer for later viewing, processing, or displaying on the screen of a game device or a television system. It is also popularly done that the shot moving images are uploaded to a posting site on the Internet so as to share them with the other users.

Among the digital cameras are those capable of shooting panoramic images, which allow the image taking of panoramic images of wide view angle with perfect ease. Also in wide use are software tools that can generate a panoramic image by stitching together a plurality of images shot by a digital camera from different shooting directions.

There is a site named "360cities" (http://www.360cities.net) that accepts the posting of panoramic images shot by users and show them on the Internet, so that the users around the world can view the panoramic images posted.

When a multitude of panoramic images from different shooting locations are posted on a site, it is necessary to contrive to organize the panoramic images by shooting location, for instance. Otherwise, the consequence will be a disorderly display on the site of a plurality of panoramic images of different shooting locations, which will not facilitate any active utilization of the panoramic images.

The above site named 360cities, which links the posted panoramic images on a planar map, makes use of an interface through which the user can search for a spot on the map to select and view the panoramic images shot at the spot.

However, the panoramic images of different shooting locations are not directly associated with each other. Therefore, upon completion of viewing panoramic images shot at a certain spot, the user must return to the map display and search for a new spot on the map where he/she selects panoramic images shot at the new spot.

SUMMARY OF THE INVENTION

The present invention has been made in view of these problems, and a general purpose thereof is to provide a technology for associating the panoramic images of different shooting locations with each other so as to facilitate efficient viewing.

In order to resolve the above-described problems, a panoramic image display apparatus according one embodiment of the present invention includes: a storage configured to store panoramic images where information on shooting locations and shooting orientations are associated with each other; an acquisition unit configured to acquire a panoramic image to be displayed, from the storage; a marker setting unit configured to associate a marker, indicating the presence of another panoramic image in a shooting direction, with the panoramic image to be displayed, when the another panoramic image has a shooting location that is in the shooting direction of the panoramic image to be displayed; a mapping processing unit configured to map the panoramic image to be displayed which is associated with the marker of the another panoramic image, into a three-dimensional (3D) panoramic space as a texture; a three-dimensional (3D) image generator configured to generate a three-dimensional (3D) panoramic image, when the three-dimensional panoramic image mapped by the mapping processing unit is viewed in a specified line of sight in such a manner as to regard the shooting location of the panoramic image to be displayed as a viewpoint position; a display control unit configured to display the three-dimensional panoramic image on a screen; and an interface configured to receive an instruction from user concerning the displayed three-dimensional panoramic image.

Another embodiment of the present invention relates also to a panoramic image display apparatus. The apparatus includes: a storage configured to store panoramic images where information on shooting locations and shooting orientations are associated with each other; an acquisition unit configured to acquire a panoramic image to be displayed, from the storage; a marker setting unit configured to associate a marker, indicating the presence of another panoramic image in a shooting direction, with the panoramic image to be displayed, when the another panoramic image has a shooting location that is in the shooting direction of the panoramic image to be displayed; and a display control unit configured to display on a screen the panoramic, to be displayed, which is associated with the marker of the another panoramic image.

Still another embodiment of the present invention relates to a method for displaying a panoramic image. The method includes: reading, by a processor, a panoramic image at a shooting place as the panoramic image to be displayed on a screen, from a storage device that stores a plurality of panoramic images where information on shooting locations and shooting orientations are associated with each other; and associating, by the processor, a marker, that indicates the presence of another panoramic image in a shooting direction, with the panoramic image to be displayed, when the another panoramic image has a shooting location that is in the shooting direction of the panoramic image to be displayed, and displaying thereby, on the screen, the panoramic to be displayed.

Still another embodiment of the present invention relates to a program. The program is embedded in a non-transitory computer-readable medium, and the program includes: an acquisition module operative to acquire a panoramic image to be displayed, from a storage that stores panoramic images where information on shooting locations and shooting orientations are associated with each other; a marker setting module operative to associate a marker, indicating the presence of another panoramic image in a shooting direction, with the panoramic image to be displayed, when the another panoramic image has a shooting location that is in the shooting direction of the panoramic image to be displayed; a mapping module operative to map the panoramic image to be displayed, together with the marker of the another panoramic image, into a three-dimensional (3D) panoramic space as a texture; and a 3D image generating module operative to generate a three-dimensional (3D) panoramic image when the three-dimensional panoramic space is viewed in a specified line of sight, with a shooting location of the panoramic image to be displayed being set as a viewpoint position.

Optional combinations of the aforementioned constituting elements, and implementations of the invention in the form of methods, apparatuses, systems, computer programs, data structures, recording media and so forth may also be effective as additional modes of the present invention.

The present facilitates efficient viewing of panoramic images of different shooting locations and times.

BRIEF DESCRIPTION OF DRAWINGS

FIGS. 8A to 8E are illustrations with which to explain a method of alignment by color-difference correction when a plurality of images are stitched together.

DETAILED DESCRIPTION OF THE INVENTION

A description will be given of an outline of a preferred embodiment. Assume first that a plurality of panoramic images shot at different shooting locations are provided. Assume also that when a panoramic image shot at a certain shooting location is selected to be displayed and a viewer is used to view this panoramic image, the presence of panoramic images shot at the other shooting locations is indicated by markers within the panoramic image being displayed.

A panoramic image contains not only the latitude and longitude information of the shooting location but also the information on the shooting orientation (azimuth) of the panoramic image. Suppose that there is a location where another panoramic image has been shot in a certain shooting direction of the panoramic image, for example, in a southwesterly direction. In this case, a marker indicating the presence of another panoramic image is displayed in a portion of the panoramic image, to be displayed, which was shot facing the southwesterly direction. A number of markers like this are associated with the panoramic image.

When a user selects a marker within a panoramic image to be displayed while he/she is viewing the panoramic image by a viewer, another panoramic image corresponding to the marker is displayed in the place of the panoramic image having been viewed so far. If there is another shooting location of the another panoramic image in a specific shooting direction of the other panoramic image, a marker is displayed, in a similar manner, in the portion thereof facing the shooting direction. Thus, switching to still another panoramic image can be effected by selecting the marker.

In this manner, the user can view panoramic images by switching them from one shooting location to another shooting location, as if through a time-warp, by selecting markers displayed in the panoramic images.

Figure 1:
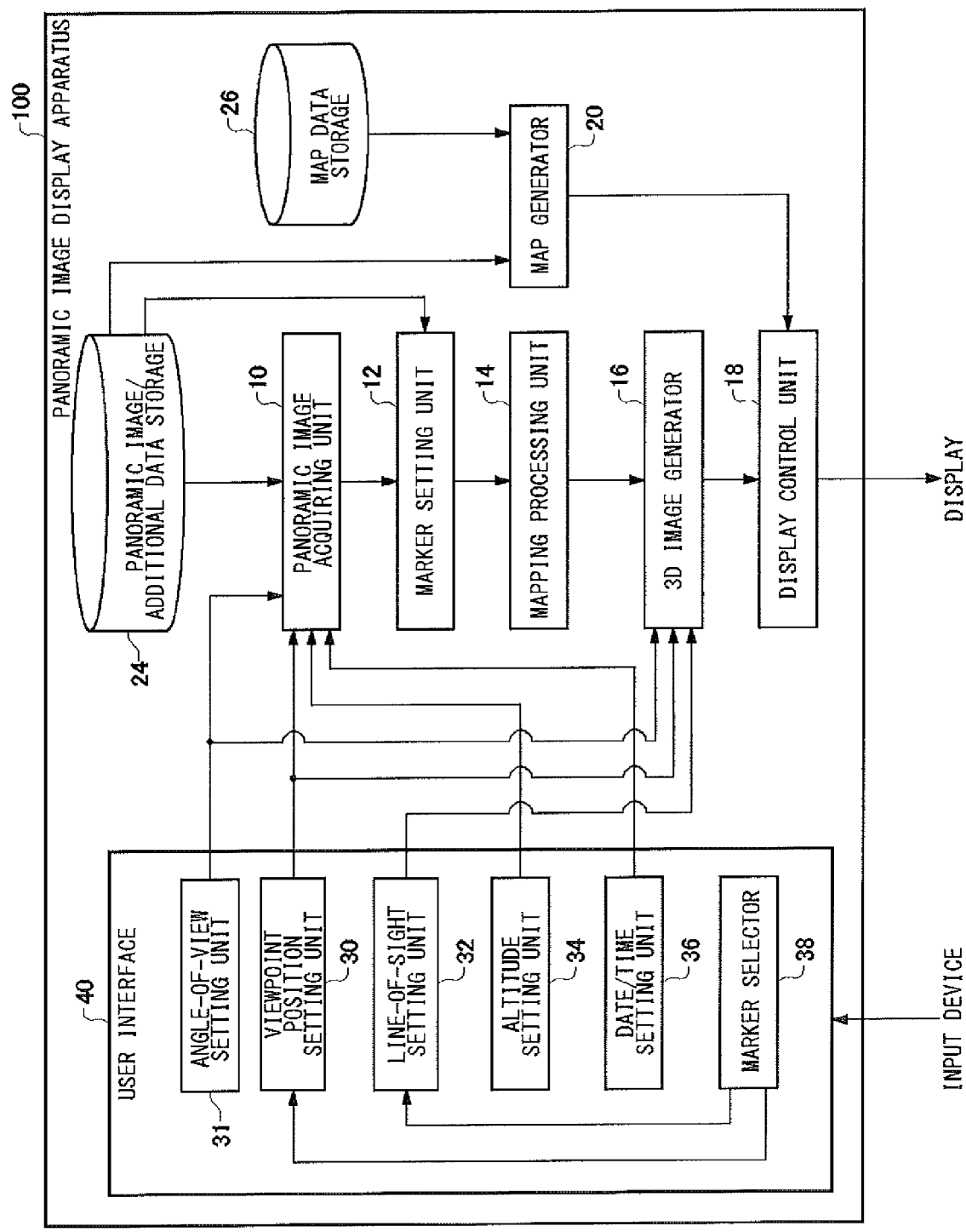
FIG. 1 is a configuration diagram of a panoramic image display apparatus 100 according to an embodiment.

FIG. 1 is a configuration diagram of a panoramic image display apparatus 100 according to a preferred embodiment. A panoramic image/additional data storage 24 stores panoramic images having information on shooting locations and information on shooting orientations associated with each other. The additional data, such as information on shooting locations and shooting orientations, may be added directly to a data file of panoramic images, or may be managed as a separate file from the panoramic images.

The information on shooting locations includes, for instance, information on latitudes and longitudes which is given by GPS (Global Positioning System). The information on shooting orientation includes, for instance, information on the azimuth (angle of orientation) of the center point of a panoramic image obtained from an azimuth sensor, and may also additionally include information on the elevation angle and roll angle of a camera at the time of shooting.

If the azimuth of the center point of a panoramic image is given as information on a shooting orientation, then it is possible to calculate the orientation of an arbitrary point of the panoramic image based on the angle of panning the camera to the right or left. The panoramic images may have, as the information on the shooting orientations, the coordinate values of pixels in the orientations of true north, true south, true east, and true west of the panoramic images which are calculated based on the azimuths and pan angles of the center points of the panoramic images.

A panoramic image acquiring unit 10 acquires a panoramic image to be displayed from the panoramic image/additional data storage 24. The panoramic image to be displayed is identified as the user specifies a shooting location on a map or the like. Or if the user specifies a marker within a panoramic image, then another panoramic image corresponding to the marker will be specified as a new panoramic image to be displayed.

When there is a shooting location of another panoramic image in a shooting orientation of the panoramic image to be displayed, a marker setting unit 12 associates a marker indicating the presence of the other panoramic image in the shooting orientation with the panoramic image to be displayed. The marker setting unit 12 can identify in which orientation (azimuth) of the panoramic image to be displayed the shooting location of the other panoramic image exists, based on the latitude and longitude information of the panoramic image to be displayed and the latitude and longitude information of the other panoramic image stored in the panoramic image/additional data storage 24. The marker functions as a link that associates the panoramic images with each other using the shooting locations and the shooting orientation. In order to identify the panoramic image to be linked, the marker may contain the latitude and longitude information of the shooting location of the panoramic image to be linked or may contain identification information that uniquely identifies the panoramic image to be linked.

The marker setting unit 12 sets different display modes for a marker according to the distance between the shooting location of the panoramic image to be displayed and the shooting location of the other panoramic image. For example, the marker for a shooting location at close range may be displayed more conspicuously in size, color, and/or shape, whereas the marker for a shooting location at long range may be displayed translucently or at a higher position than the other markers so as to give the user an impression of great distance.

A mapping processing unit 14 processes a mapping of a panoramic image to be displayed, which has been associated with markers for the other panoramic images, into a three-dimensional panoramic space as textures. In the case of a spherical panoramic image, a sphere is assumed as a three-dimensional panoramic space, and the panoramic image is texture-mapped onto the spherical surface by a sphere mapping. Or a cube may be assumed as a three-dimensional panoramic space, and the panoramic image may be texture-mapped onto the cubic surface by a cube mapping. Also, in the case where the panoramic image does not have any component in tilt directions and spreads only in the panning directions, a cylinder may be assumed as a three-dimensional panoramic space, and the panoramic image may be texture-mapped onto the cylindrical surface by a texture mapping. The same applies to the case where the panoramic image does not have any component in the panning directions and spreads only in tilt directions.

The mapping processing unit 14 performs a mapping of a panoramic image to be displayed as textures into a three-dimensional panoramic space and then maps the markers associated with the shooting directions of the panoramic image into the three-dimensional panoramic space. In this manner, the markers are integrated into the panoramic image.

It should be noted that the mapping processing unit 14 does not necessarily map all the markers associated with a panoramic image to be displayed. This is because integration of a large number of markers into a panoramic image can make it hard to view the panoramic image. Therefore, if a number of markers together are associated with a single shooting direction or its vicinity of a panoramic image to be displayed, the arrangement may be such that a marker representing a plurality of markers together is mapped for display. And in this arrangement, when a cursor is brought closer to the representative marker, the representative marker develops into a plurality of markers for display. Or the arrangement may be such that the markers are classified by theme using such information as keywords given as additional information of a panoramic image, and the markers of the theme that suits the user's taste only are mapped.

A 3D image generator 16 generates a three-dimensional (3D) panoramic image when the 3D panoramic space having a panoramic image texture-mapped thereon by the mapping processing unit 14 is viewed in a specified line of sight. When the 3D panoramic space is a sphere, the viewpoint is placed at the center of the sphere. When the 3D panoramic space is a cube, the viewpoint is placed at the center of the interior of the cube. And when the 3D panoramic space is a cylinder, the viewpoint is placed on the center axis of the cylinder. The viewpoint is the location where the panoramic image to be displayed is shot, and the line of sight is the direction in which the surrounding area is viewed and is thus identified by the azimuth and the elevation angle. The 3D image generator 16 generates a 3D image when the 3D panoramic space is viewed in the line of sight identified by the azimuth and the elevation angle.

A map generator 20 generates a map image of the surface of the earth by referencing map data stored in a map data storage 26 and setting a symbol indicating the presence of a panoramic image at the position of the earth's surface corresponding to the shooting location.

A display control unit 18 has a 3D panoramic image or a map image thus generated displayed on a screen of the display unit.

Figure 2:
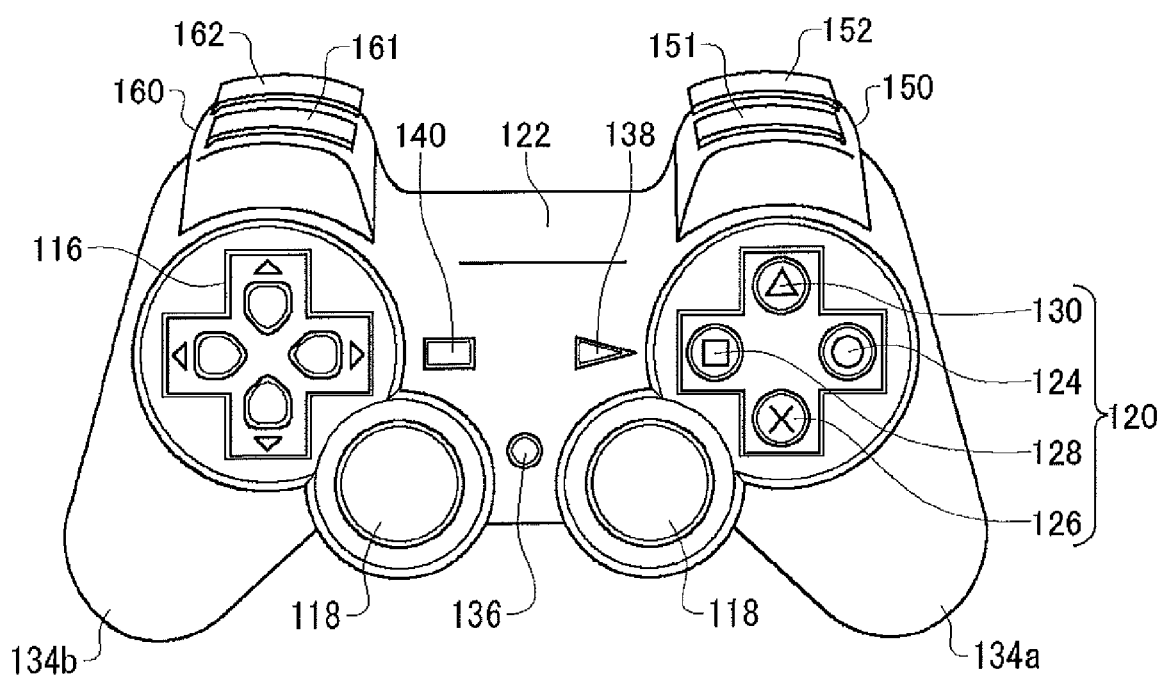
FIG. 2 shows a structure of a controller, connected to the panoramic image display apparatus of FIG. 1, which is an example of an input device.

A user interface 40 is a graphical user interface through which the user can manipulate the graphics displayed on the screen of a display using an input device. The user interface 40 receives user instructions on the map or 3D panoramic image displayed on the screen from the input device which may be a controller of a game device, a mouse, a keyboard, or the like. FIG. 2 shows a controller 102 as an example of the input device, whose construction will be discussed in detail later.

Upon receipt of an instruction from the user to select a symbol of a panoramic image on the map image being displayed, the user interface 40 instructs the panoramic image acquiring unit 10 to acquire a specified panoramic image from the panoramic image/additional data storage 24.

The user can input instructions to change the line of sight for viewing the 3D panoramic space by operating an analog stick 118 or direction keys 116 of the controller 102, for instance. A line-of-sight setting unit 32 of the user interface 40 gives a line of sight instructed by the user to the 3D image generator 16. The 3D image generator 16 generates an image when the 3D panoramic space is viewed in a specified line of sight.

An angle-of-view setting unit 31 sets an angle of view when the user has performed a zoom operation on the panoramic image being displayed and gives the information of the angle of view thus set to the panoramic image acquiring unit 10 and the 3D image generator 16. Where panoramic images of different angles of view are stored in the panoramic image/additional data storage 24, the panoramic image acquiring unit 10 reads out a panoramic image of an angle of view closest to the set angle of view and changes the panoramic image to be displayed. The 3D image generator 16 realizes the visual effects of zoom-in and zoom-out by enlarging or reducing the 3D panoramic image according to the set angle of view.

A panoramic image may have information on the shooting altitude, and the panoramic image/additional data storage 24 may store panoramic images shot at different altitudes at the same shooting location. In such a case, the user can input instructions to change the altitude by operating L1/L2 buttons 161 and 162 provided on the left front of the casing of the controller 102, for instance. Pressing the L1 button 161 will give an instruction to raise the altitude, and pressing the L2 button 162 will give an instruction to lower the altitude.

The display control unit 18 may indicate to the user, for instance, with small arrows at the top and bottom portions of the screen that the panoramic image currently being displayed has panoramic images shot at different altitudes at the same shooting location. An arrow facing upward in the top portion of the screen indicates the presence of a panoramic image shot at a higher altitude than the current one, and an arrow facing downward in the bottom portion of the screen indicates the presence of a panoramic image shot at a lower altitude than the current one.

Upon receipt of an instruction from the user to change the altitude, the altitude setting unit 34 of the user interface 40 instructs the panoramic image acquiring unit 10 to acquire a panoramic image corresponding to the specified altitude, despite the same latitude and longitude, from the panoramic image/additional data storage 24. The panoramic image acquiring unit 10 acquires a panoramic image of a higher shooting altitude than the panoramic image currently being displayed when the L1 button 161 is pressed, and acquires a panoramic image of a lower shooting altitude than the current one when the L2 button 162 is pressed.

When a display is produced by switching to a panoramic image of a different shooting altitude, the display control unit 18 may give a special effect to the image so that the user may have a sense of riding an elevator up or down. For example, when switching to a panoramic image of a higher altitude, the panoramic image currently being displayed can be scrolled downward, thereby having the panoramic image of a higher altitude descend from above with the result that the user may have a sense of having risen upstairs.

A panoramic image contains information on the shooting date and time, and the panoramic image/additional data storage 24 may store panoramic images shot at different dates and times at the same shooting location. In such a case, the user can input instructions to change the date and time by operating R1/R2 buttons 151 and 152 provided on the right front of the casing of the controller 102, for instance. Pressing the R1 button 151 will give an instruction to shift to a later date and time, and pressing the R2 button 152 will give an instruction to shift to an earlier date and time.

The display control unit 18 may indicate to the user, for instance, with watch and calendar icons in the corner of the screen that the panoramic image currently being displayed has panoramic images shot at different dates and times. Watch icons may be displayed to indicate the presence of panoramic images for different times of day such as morning, noon, and night, where calendar icons may be displayed to indicate the presence of panoramic images for different seasons such as spring, summer, autumn, and winter.

Upon receipt of an instruction from the user to change the date and time, the date/time setting unit 36 of the user interface 40 instructs the panoramic image acquiring unit 10 to acquire a panoramic image corresponding to a specified date and time at the same shooting location from the panoramic image/additional data storage 24. The panoramic image acquiring unit 10 acquires a panoramic image of a later shooting date and time than the panoramic image currently being displayed when the R1 button 151 is pressed, and acquires a panoramic image of an earlier shooting date and time than the current one when the R2 button 152 is pressed.

Thus, it is possible to switch the panoramic image being displayed to panoramic images of a different time of day or season at the same shooting location, for example, from one shot in the morning to one shot at night, or from one shot in spring to one shot in autumn. In changing the panoramic image, the display control unit 18 may give an effect of fade-in and fade-out to the image.

When the user selects a marker associated with the panoramic image being displayed, a marker selector 38 of the user interface 40 instructs a viewpoint position setting unit 30 to set the shooting location of another panoramic image corresponding to the selected marker as a new viewpoint position. The viewpoint position setting unit 30 instructs the panoramic image acquiring unit 10 to acquire a panoramic image corresponding to the new viewpoint position, namely, another image identified by the marker, from the panoramic image/additional data storage 24. Also, the viewpoint position setting unit 30 conveys the new viewpoint position to the 3D image generator 16.

Further, when the panoramic image thus far displayed has been switched to another panoramic image identified by the marker, the marker selector 38 can also instruct the line-of-sight setting unit 32 to set the line of sight in a predefined direction so that the line of sight can be fixed in a constant direction. For example, the marker selector 38 can instruct the line-of-sight setting unit 32 to set an initial line of sight in a direction in which the shooting location of another panoramic image identified by the marker is viewed from the shooting location of the current panoramic image. Or the marker selector 38 can instruct the line-of-sight setting unit 32 to set the initial line of sight in a direction in which the shooting location of the current panoramic image is looked back at from the shooting location of another panoramic image identified by the marker.

The line-of-sight setting unit 32 gives the specified line of sight to the 3D image generator 16. When changing the panoramic image, the 3D image generator 16 generates an image when the 3D panoramic space is viewed in the line of sight specified by the line-of-sight setting unit 32. Thus, the user can view a new panoramic image by setting the line of sight in the orientation for which the marker is set or can view a new panoramic image by setting the line of sight in the direction in which the shooting location of the panoramic image having been viewed before the selection of the marker is looked back at.

FIG. 2 shows a structure of a controller, connected to the panoramic image display apparatus of FIG. 1, which is an example of an input device. The panoramic image display apparatus 100 may be a game device, for instance.

The controller 102 has a plurality of buttons and keys to receive control inputs to the panoramic image display apparatus 100. As the user operates on the buttons or keys of the controller 102, their operation inputs are transmitted to the panoramic image display apparatus 10 through wireless or wired connections.

Provided on a casing top surface 122 of the controller 102 are a group of arrow keys 116, analog sticks 118, and a group of operation buttons 120. The group of direction keys 116 include "up-", "down-", "left-", and "right-" direction indication keys. The group of operation buttons 120 include a circle button 124, a cross button 126, a square button 128, and a triangle button 130.

The user holds a left-hand grip 134b with the left hand and holds a right-hand grip 134a with the right hand, and operates the group of direction keys 116, the analog sticks 118, and the group of operation buttons 120 on the casing top surface 122.

Provided on a front side of the controller 102 are a right-hand operation part 150 and a left-hand operation part 160. The right-hand operation part 150 includes an R1 button and an R2 button, whereas the left-hand operation part 160 includes an L1 button 161 and an L2 button 162.

The user can shift a pointer displayed on the screen in vertical and horizontal directions by operating the directional key group 116. For example, when selecting one of a plurality of markers displayed within a panoramic image, the user can shift the pointer between the plurality of markers on the screen by operating the directional key group 116. The user can select a desired marker by pressing the circle button 124 when the pointer has come upon the marker.

Different functions may be assigned to the respective buttons of operation buttons 120 by a panoramic image display application program. For example, the function to specify the display of a menu is assigned to the triangle button 130, the function to specify the cancel of a selected item is assigned to the cross button 126, the function to specify the determination of a selected item is assigned to the circle button, and the function to specify the display/non-display of table of contents or the like is assigned to the square button 128.

The analog sticks 118 have means to output analog values as they are tipped by the user. The controller 102 sends an analog output signal corresponding to the direction and amount of tipping of the analog stick 118 to the panoramic image display apparatus 100. For example, the user can shift the viewpoint in a desired direction within a 3D panoramic image shown on the display by tipping the analog stick 118 in the desired direction.

The casing top surface 122 is further provided with an LED button 136, a selector button 140, and a start button 138. The LED button 136 is used as the button for the display of the menu screen on the display, for instance. The start button 138 is the button with which the user instructs the start of a panoramic image display application, the start or pause of playback of a panoramic image, or the like. The selector button 140 is the button with which the user instructs a selection from a menu display shown on the display or the like.

FIGS. 3A to 3D are illustrations with which to explain the mechanism and shooting directions of an omnidirectional image shooting system 230 used to shoot panoramic images.

Figure 3A:
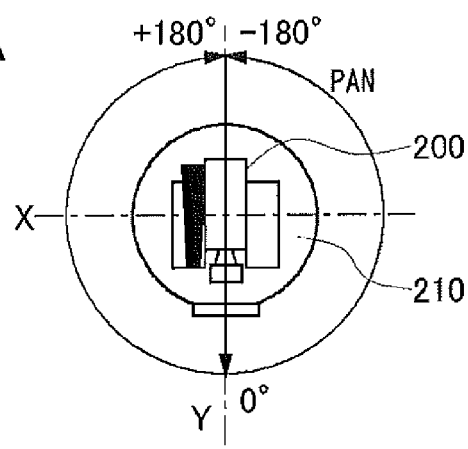
FIGS. 3A to 3D are illustrations with which to explain the mechanism and shooting directions of an omnidirectional image shooting system used to shoot panoramic images.
Figure 3B:
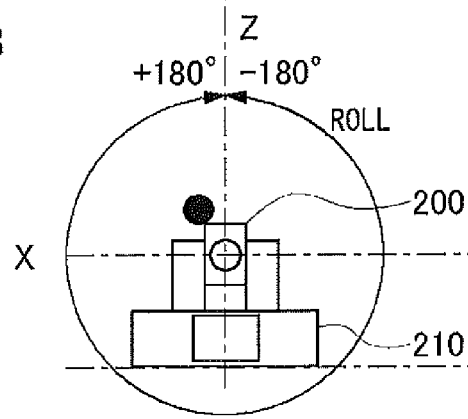
Figure 3C:
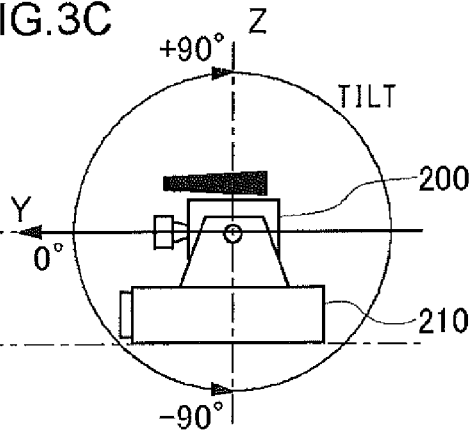
Figure 3D:
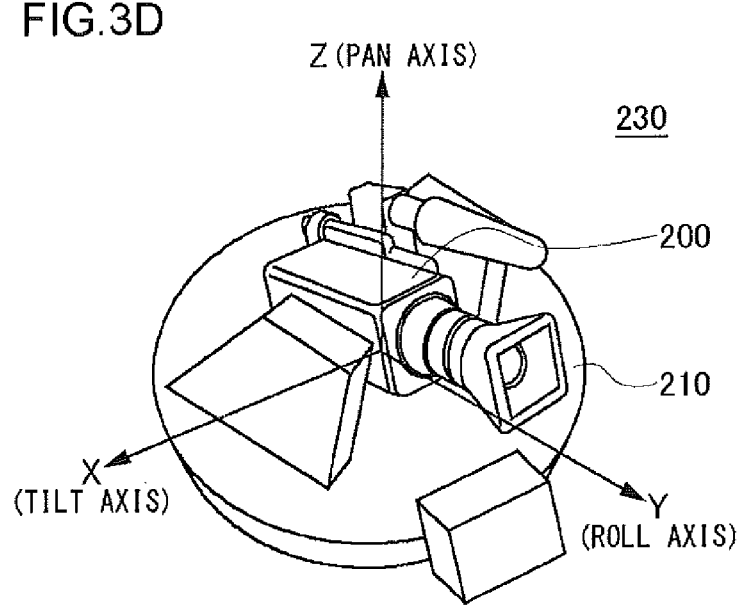

As shown in FIG. 3D, a camera 200 in the omnidirectional image shooting system 230 is secured onto a control disk 210. And a camera's pan angle can be changed as the control disk 210 is rotated around a Z axis, a camera's tilt angle can be changed as the control disk 210 is rotated around an X axis, and a camera's roll angle can be changed as the control disk 210 is rotated around a Y axis. The Z axis herein is the vertical axis (gravitational direction axis).

FIG. 3A is a top view of the camera 200 installed on the control disk 210. The initial position (Y-axis direction) of the control disk is pan angle 0°, and the pan angle can be changed within a range of −180° to +180° around the Z axis.

FIG. 3B is a front view of the camera 200 installed on the control disk 210. The horizontal state of the control disk 210 is roll angle 0°, and the roll angle can be changed within a range of −180° to +180° around the Y axis.

FIG. 3C is a side view of the camera 200 installed on the control disk 210. The horizontal state of the control disk 210 is tilt angle 0°, and the tilt angle can be changed within a range of −90° to +90° around the X axis.

In order to endow a panoramic image shot by the omnidirectional image shooting system 230 of FIG. 3D with information on the shooting orientations, it is necessary to record the orientations of the camera 200 at the time of image taking. For that purpose, the omnidirectional image shooting system 230 is provided with an azimuth sensor for measuring orientations and an acceleration sensor for measuring tilt angles. The omnidirectional image shooting system 230 is further provided with a GPS sensor or the like for measuring the shooting location and time.

Figure 4A:
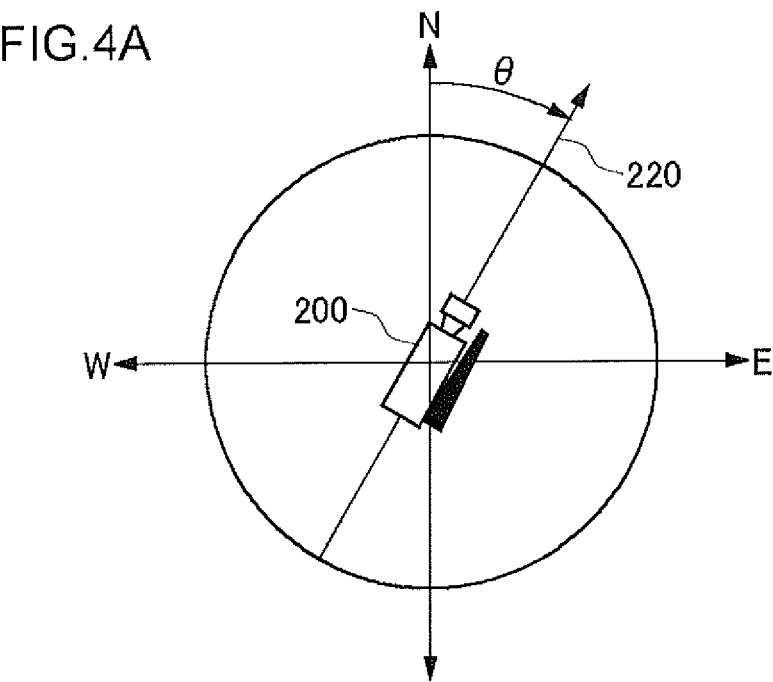
FIG. 4A is an illustration with which to explain azimuth angle θ of a camera.
Figure 4B:
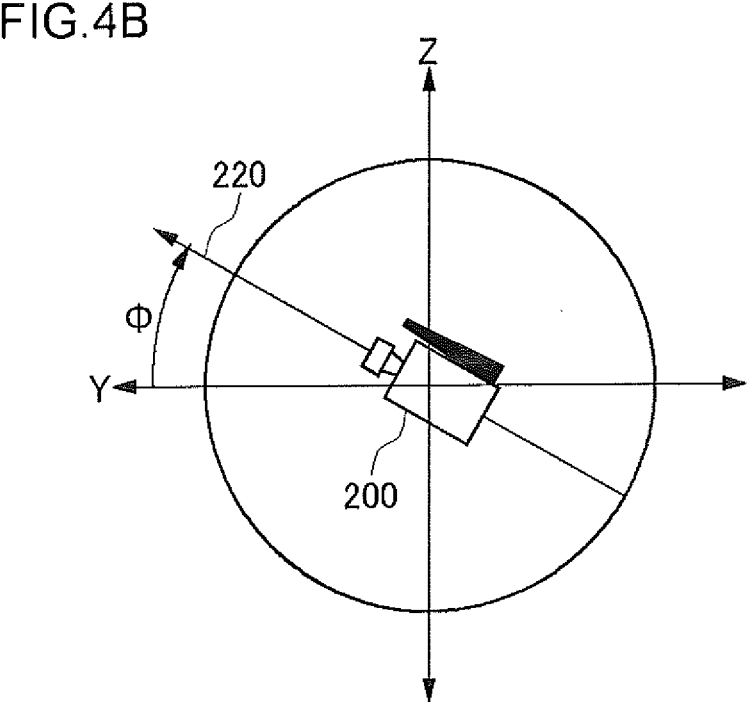
FIG. 4B is an illustration with which to explain elevation angle φ of a camera.

FIG. 4A is an illustration with which to explain azimuth angle θ of the camera 200, and FIG. 4B is an illustration with which to explain elevation angle φ of the camera 200. FIG. 4A is a top view of the camera 200, in which the camera 200 in an initial position of shooting faces a direction 220 which is azimuth angle θ displaced from true north to east. This direction is equal to pan angle 0°. In other words, the azimuth angle of the reference direction 220 of the pan angle is θ. When shooting a panoramic image, the image of an object is taken panoramically by changing the pan angle in a range of −180° to +180° with respect to the reference direction 220 of the azimuth angle θ.

FIG. 4B is a side view of the camera 200. The elevation angle φ is the direction of tilt 0°, which is an angle where an upper direction is defined to be positive in relation to the Y-axis direction, when the camera 200 is rotated around the X axis. Normally, the elevation angle φ is 0° since the image taking is done with the camera 200 set in a horizontal position. To shoot a spherical panoramic image, however, it is necessary to take the images of the object by changing the elevation angle φ with the tilt of the camera.

Figure 5A:
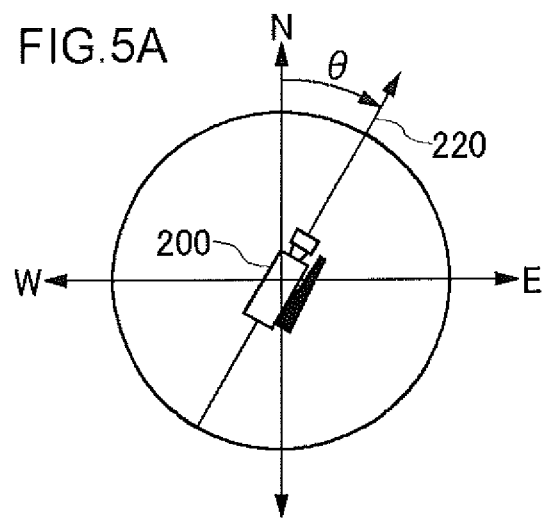
FIGS. 5A to 5C are illustrations with which to explain a panoramic image shot when an initial position of a camera is in a direction of azimuth angle θ.
Figure 5B:
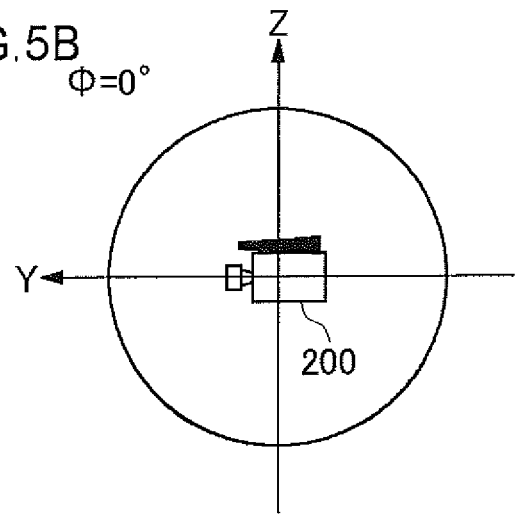
Figure 5C:
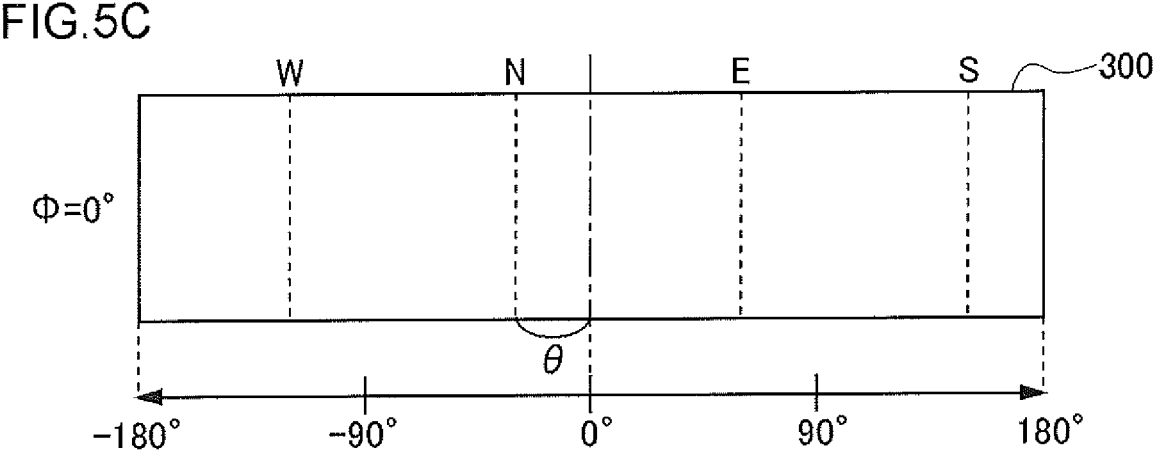

FIGS. 5A to 5C are illustrations with which to explain a panoramic image shot when the initial position of the camera 200 is in a direction of the azimuth angle θ.

As shown in the top view of FIG. 5A, the camera 200 in the initial position faces the direction 220 of azimuth angle θ. And as shown in the side view of FIG. 5B, the elevation angle of the camera 200 is φ=0°. With the elevation angle kept at φ=0°, an omnidirectional panoramic view is shot at the elevation angle φ=0° while the pan angle of the camera 200 with respect to the reference direction 220 is varied within a range of −180° to +180°. FIG. 5C is a panoramic image 300 taken in the above-described manner. At the center of the panoramic image 300, the pan angle is 0°. The left half of the panoramic image 300 is an image such that it is taken by varying the pan angle within a range of 0° to −180°. Similarly, the right half of the panoramic image 300 is an image such that it is taken by varying the pan angle within a range of 0° to 180°.

The central position of the pan angle 0° is displaced from true north by azimuth angle θ. Thus, the positions of north (N), south (S), east (E), and west (W) are those indicated by dotted lines. As long as the panoramic image 300 contains the azimuth angle θ of the central position of pan angle 0° as the information on the shooting orientations, the pixel positions of north (N), south (S), east (E), and west (W) can be evaluated in consideration of a displacement of the azimuth angle θ. Alternatively, instead of the azimuth angle θ, the coordinate values of pixel positions of north (N), south (S), east (E), and west (W) may be used as the information on the shooting orientations.

In order to obtain a spherical panoramic image, it is necessary to take images by varying the elevation angle of the camera 200. For example, if the angle of view of the camera 200 is 60°, a spherical panoramic image can be theoretically obtained as follows. That is, the camera 200 is tilted vertically at ±60°, and the similar image taking is done by varying the pan angle within a range of −180° to +180°.

Figure 6A:
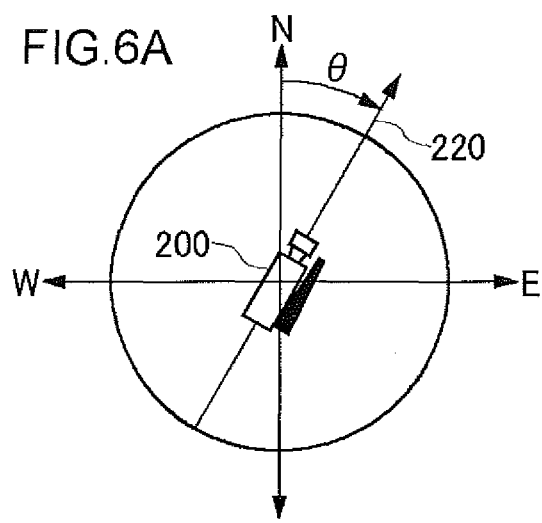
FIGS. 6A to 6C are illustrations with which to explain a panoramic image shot when a camera is in a direction of elevation angle φ=60°.
Figure 6B:
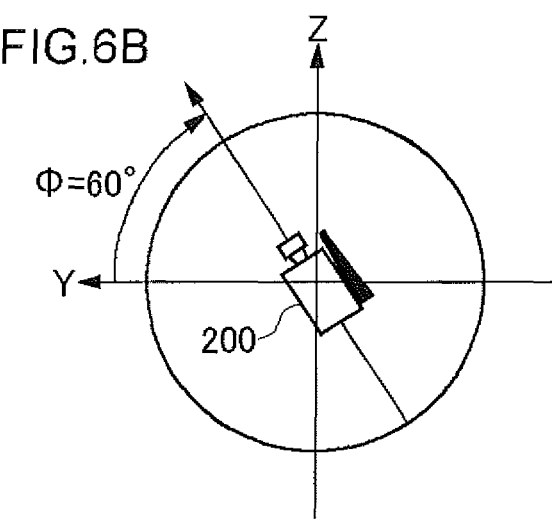
Figure 6C:
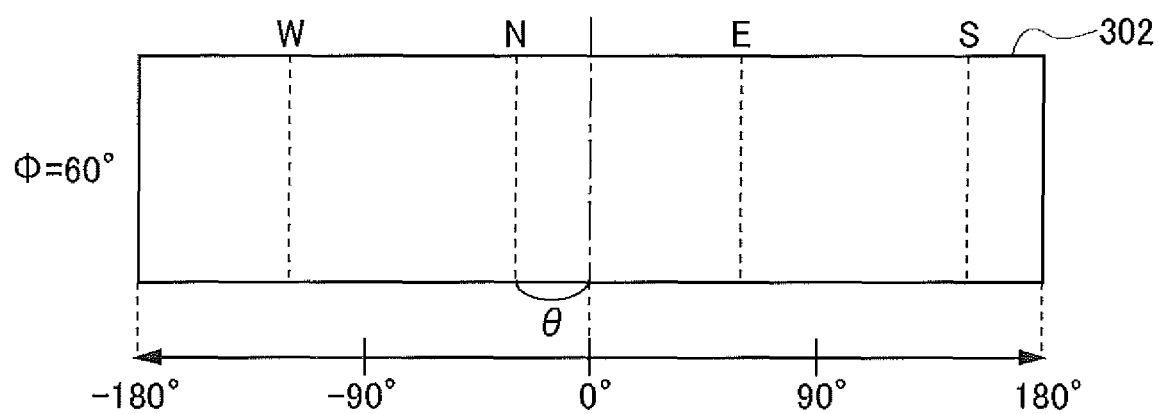

FIGS. 6A to 6C are illustrations with which to explain a panoramic image shot when a camera 200 is in a direction of elevation angle φ=60°. As shown in the top view of FIG. 6A, the camera 200 in the initial position faces the direction 220 of azimuth angle θ. And as shown in the side view of FIG. 6B, the elevation angle of the camera 200 is φ=0°. With the elevation angle kept at φ=60°, a panoramic view 302 as shown in FIG. 6C is shot at the elevation angle φ=60° while the pan angle of the camera 220 with respect to the reference direction 220 is varied within a range of −180° to +180°.

With the elevation angle kept at φ=−60°, a panoramic view 302 is similarly shot at the elevation angle φ=−60° while the pan angle is varied within a range of −180° to +180°. A spherical panoramic image is obtained by combining the panoramic images shot at the elevation angles φ=0°, 60°, and −60. However, in implementation, a method is often employed where the vicinities of a boundary (bordering areas) are taken in an overlapped manner, in order to correct the mismatch caused by lens distortions when images are stitched together in boundary portions at the angle of view.

The spherical panoramic image obtained as described above is endowed with information on azimuth angles and elevation angles. Therefore, it is possible to identify the azimuth and elevation angle of an arbitrary pixel of the panoramic image based on the information. Also, the panoramic image is provided with the latitude and longitude information measured by GPS as the positional information of the shooting location. The additional information to be attached to the panoramic image may be recorded, for example, in the format of image file called Exif (Exchangeable Image File Format). The place-name of the shooting location can be recorded in a part of the file name, whereas the shooting date and time, the latitude and longitude of the shooting location, the altitude, the azimuth angle, and the like can be recorded as data in the Exif format. The elevation angle, which is not defined in the Exif format, is recorded as extended data.

Figure 7A:
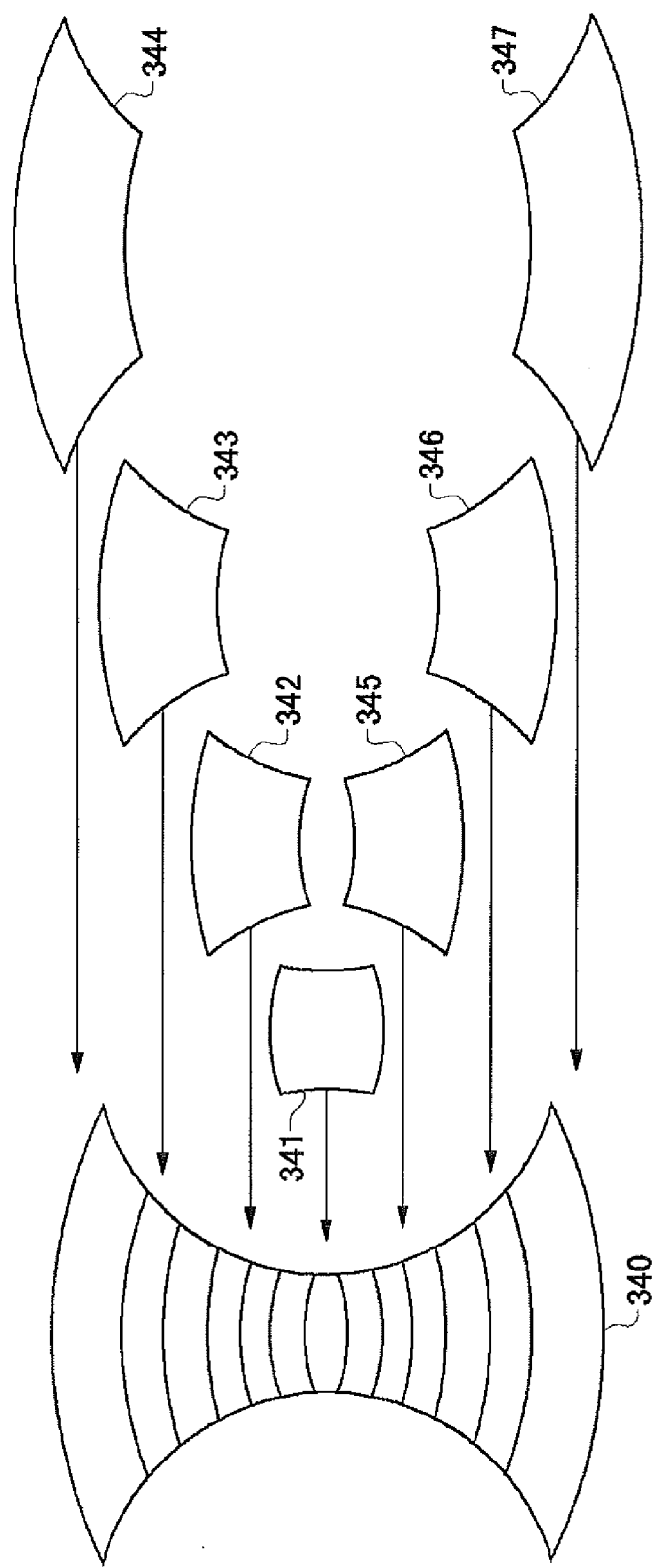
FIG. 7A explains a method of how a panoramic image is created by stitching a plurality of images together.
Figure 7B:
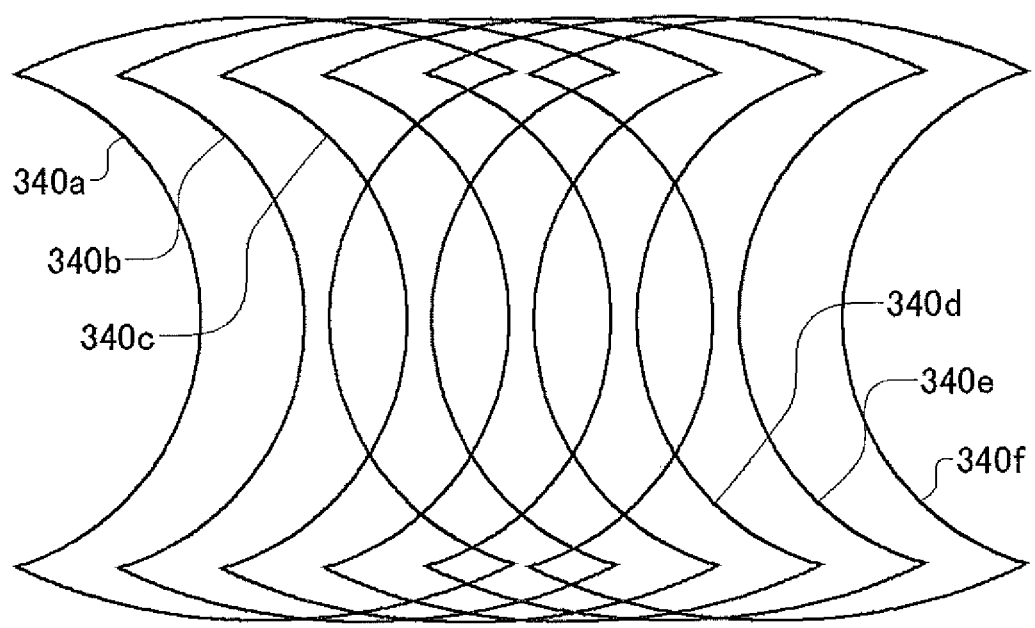
FIG. 7B explains a method of how a panoramic image is created by stitching a plurality of images together.

FIG. 7A and FIG. 7B are illustrations with which to explain a method of creating a panoramic image by stitching a plurality of images together.

In the example of FIG. 7A, seven images 341 to 347 shot by tilting (or panning) the camera 200 are mapped into a cylinder and then stitched together to prepare a cylindrical image 340. When the images are stitched together, the bordering areas of the images are overlapped with each other.

As shown in FIG. 7B, a plurality of cylindrical images like one shown in FIG. 7A are obtained in the panning (or tilting) direction by the shooting with the panning (or tilting) of the camera 200. An omnidirectional panoramic image 360 is finally obtained by synthesizing these cylindrical images 340a to 340f with the bordering areas of the images overlapped.

FIGS. 8A to 8E are illustrations with which to explain a method of alignment by color-difference correction when a plurality of images are stitched together.

When a panoramic image is generated by overlapping the bordering areas of a plurality of images, the mismatch of the overlapped portions results due to lens distortions. For example, two images 350 and 352 shown in FIG. 8A may not overlap with each other correctly in the overlapped portion, as shown in FIG. 8B, when they are simply stitched together by a parallel shift. Thus, as shown in FIGS. 8C to 8E, a search for an alignment with the least color difference of the pixels in the overlapped portion of the two images 350 and 352 is made by further rotating one of the images 352. In this example, the alignment of FIG. 8E shows the least color difference on the overlapped portion. When a plurality of images are stitched together as explained with FIGS. 7A and 7B, an image is synthesized by obtaining an optimum alignment through color-difference correction by parallel shift and rotation of the images.

Figure 9A:
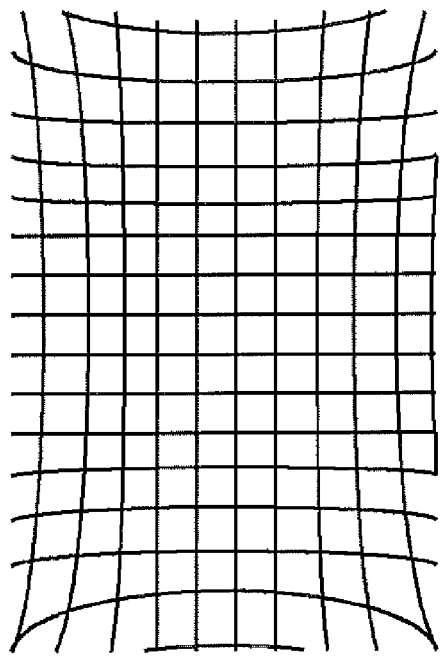
FIGS. 9A to 9C are illustrations with which to explain the correction of lens distortions.
Figure 9B:
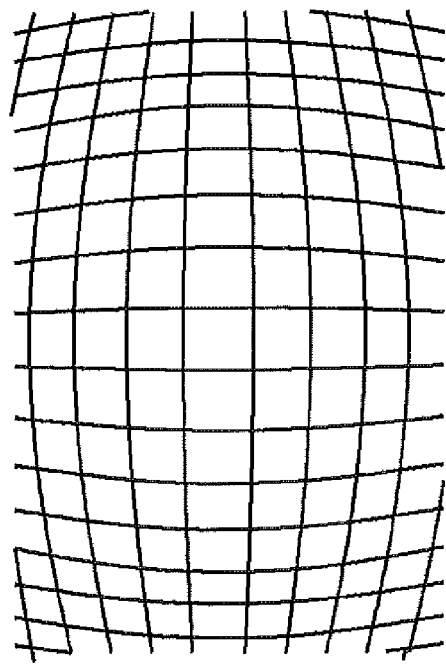
Figure 9C:
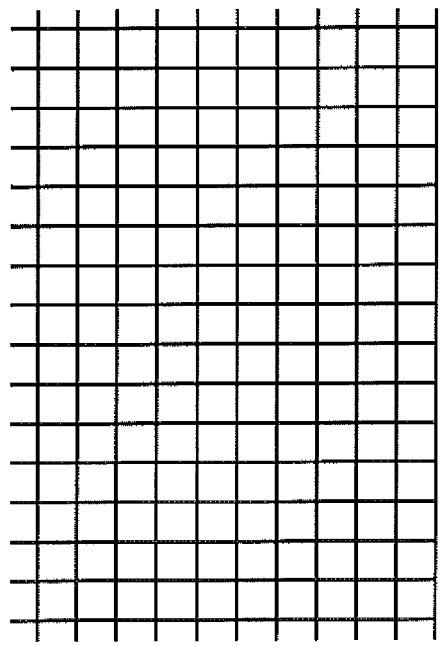

FIGS. 9A to 9C are illustrations with which to explain the correction of lens distortions. The images shot are generally subject to barrel distortion as shown in FIG. 9A or pin-cushion distortion as shown in FIG. 9B. Therefore, in the preparation of a panoramic image, an optical distortion is corrected as shown in FIG. 9C. Then the markers are associated with the panoramic image whose distortion has been corrected. As such, there is nearly accurate agreement between the direction indicated by a marker and the shooting direction indicated by the position on the panoramic image associated with the marker, so that the image is subject to little influence of errors due to lens distortions.

Figure 10:
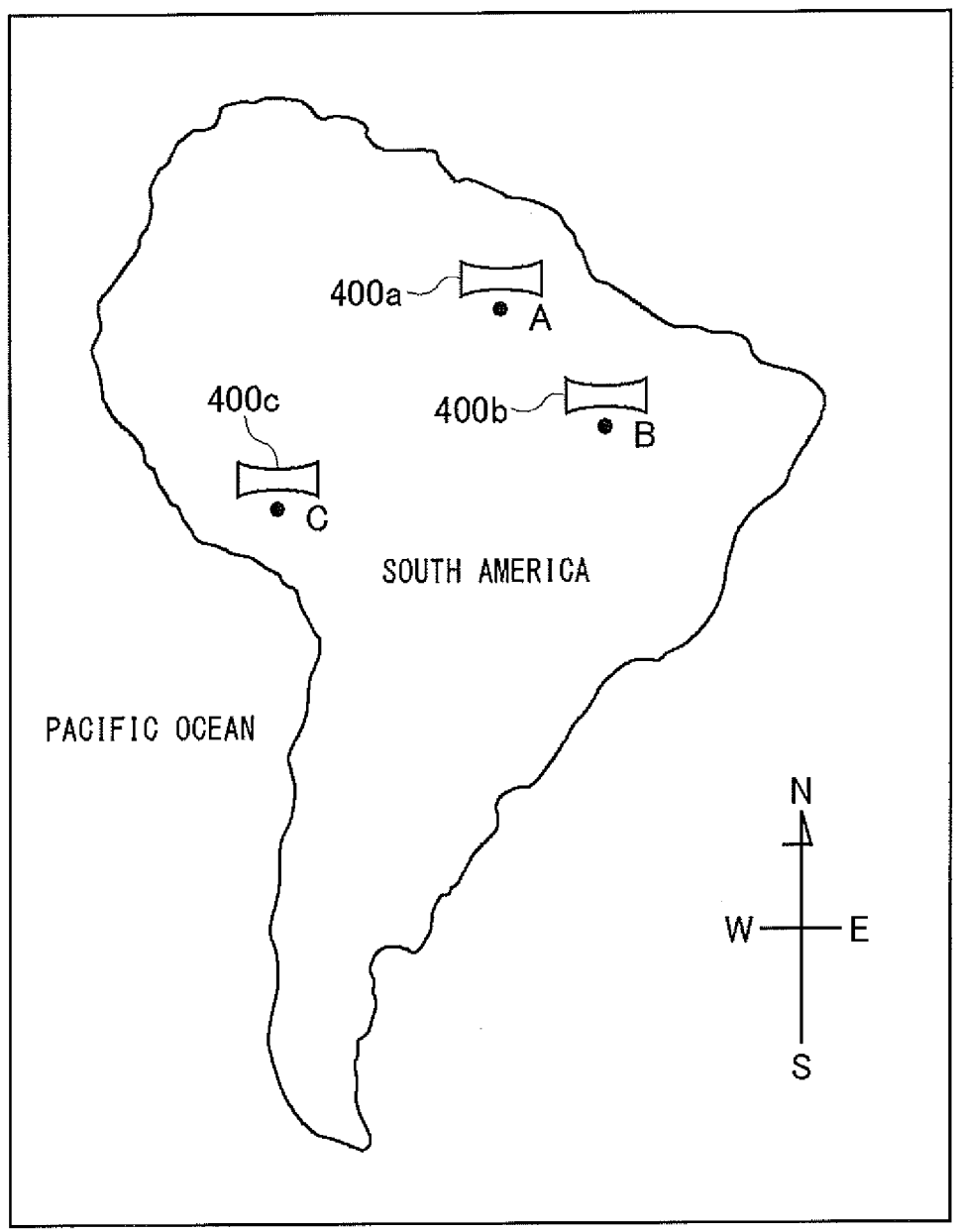
FIG. 10 is an illustration with which to explain panoramic images indicated by symbols at shooting locations on a two-dimensional map.

FIG. 10 is an illustration with which to explain panoramic images indicated by the symbols at the shooting locations on a two-dimensional map. When there are panoramic images shot at points A, B, and C in South America, the map generator 20 generates a map image incorporating and synthesizing the symbols 400a, 400b, and 400c of the panoramic images at points A, B, and C on the map of South America. These symbols are the thumb nails or icons of the panoramic images or the like. The map displayed can also be changed in reduction scale. The user sees the map and selects the panoramic image shot at a desired point.

Figure 11:
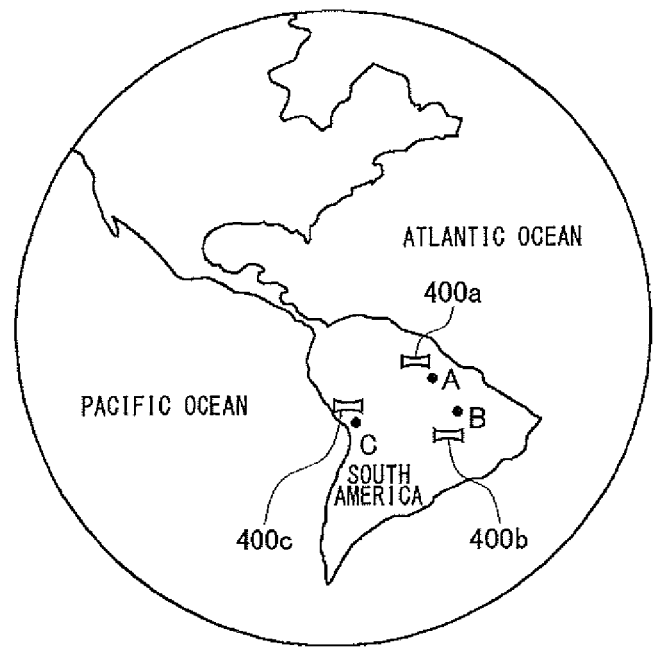
FIG. 11 is an illustration with which to explain panoramic images indicated by symbols at shooting locations on a surface of the earth in a three-dimensional display.

The map generator 20 may produce a three-dimensional display of the earth and indicate panoramic images by the symbols at the points on the surface of the earth. FIG. 11 is an illustration with which to explain panoramic images indicated by the symbols at the shooting locations on the surface of the earth in a three-dimensional display. Similar to FIG. 10, an image incorporating and synthesizing the symbols 400a, 400b, and 400c of the panoramic images at points A, B, and C in South America is displayed three-dimensionally. The user turns the earth and selects the panoramic image shot at a desired point. A zoom-in upon specifying a certain point on the earth will have an enlarged display of the map. The enlarged display may automatically switch to a two-dimensional map as shown in FIG. 10.

Figure 12:
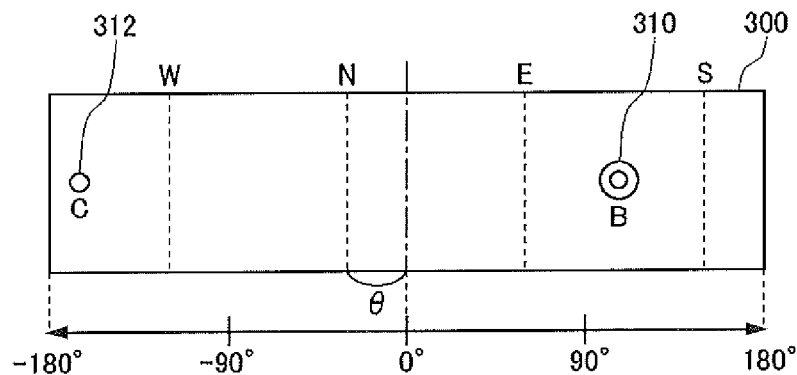
FIG. 12 is an illustration with which to explain a panoramic image associated with markers.

FIG. 12 is an illustration with which to explain a panoramic image associated with markers. A description is given here by exemplifying the panoramic image 300 at shooting point A in FIG. 10 or FIG. 11. Seen from the shooting point A, shooting point B exists in a southeasterly direction, and shooting point C exists in a southwesterly direction. Markers 310 and 312 indicating the presence of a panoramic image at the shooting point B in a southeasterly direction and a panoramic image at the shooting point C in a southwesterly direction are associated with the panoramic image 300 at the shooting point A. The marker 310 corresponding to the shooting point B is associated with the pixel position in the southeasterly orientation of the panoramic image 300, whereas the marker 312 corresponding to the shooting point C is associated with the pixel position in the southwesterly orientation thereof. Since the shooting point B is located closer to the shooting point A than the shooting point C, the marker 310 corresponding to the shooting point B is displayed with more emphasis than the marker 312 corresponding to the shooting point C. For example, the marker size is made larger, or the marker color is made darker.

Figure 13:
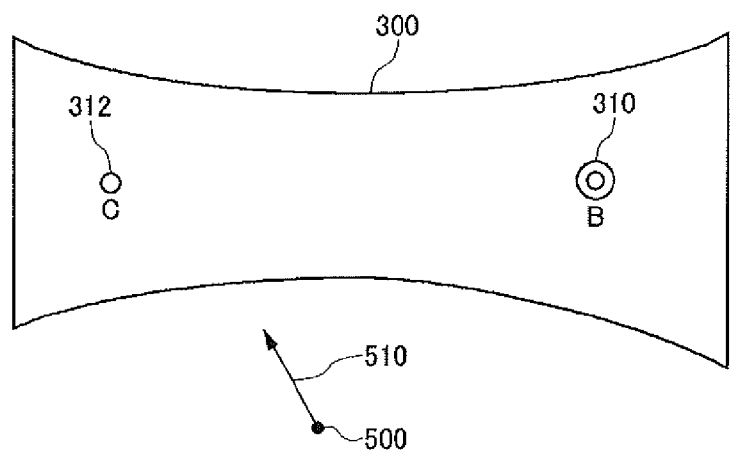
FIG. 13 is an illustration showing schematically how a panoramic image associated with markers in FIG. 12 is displayed three-dimensionally.

FIG. 13 is an illustration showing schematically how the panoramic image 300 associated with the markers in FIG. 12 is displayed three-dimensionally. The panoramic image 300 at the shooting point A is texture-mapped into a 3D panoramic space such as a spherical surface or a cylindrical surface, and a 3D image when the 3D panoramic space is viewed in the line of sight 510 from the viewpoint 500 is displayed on the screen. When the line of sight 510 is turned in the southeasterly direction, the marker 310 for the shooting point B associated with the panoramic image 300 becomes visible, and when the line of sight 510 is turned in the southwesterly direction, the marker 312 for the shooting point C becomes visible.

Suppose that the user selects the marker 310 for the shooting point B in FIG. 13. Then the panoramic image 320 at the shooting point B will be displayed in the place of the panoramic image 300 at the shooting point A which has thus far been displayed.

Figure 14:
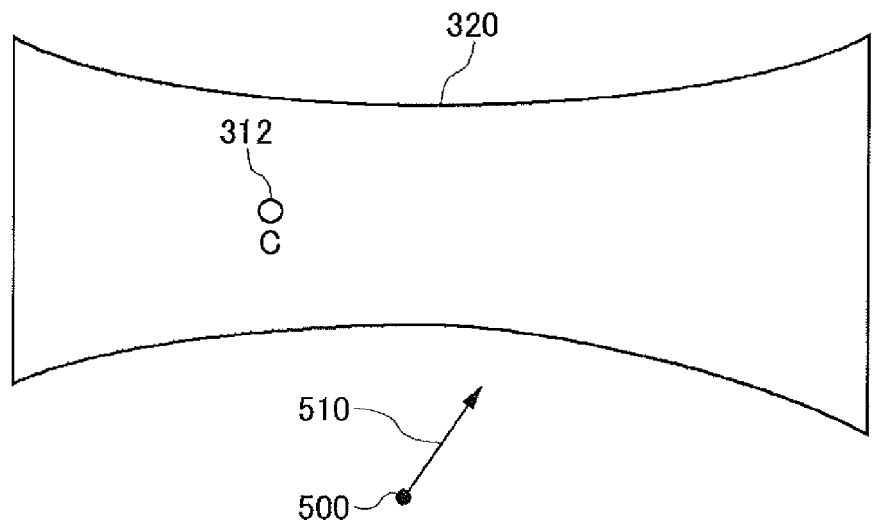
FIG. 14 is an illustration with which to explain a panoramic image displayed three-dimensionally when a marker is selected.

FIG. 14 is an illustration with which to explain a panoramic image 320 at the shooting point B which is displayed three-dimensionally when the marker 310 for the shooting point B is selected. In a similar manner, the panoramic image 320 at the shooting point B is also associated with markers indicating the presence of panoramic images at the other shooting points, for example, the marker 312 for the shooting point C here.

When the switching is made from the panoramic image 300 at the shooting point A to the panoramic image 320 at the shooting point B, the line of sight 510 of the user may be set in the direction of viewing the shooting point B from the shooting point A, namely, in the southeasterly direction. In this case, the user may have a sense of a time-warp to the shooting point B while viewing the direction toward the shooting point B from the shooting point A.

Figure 15:
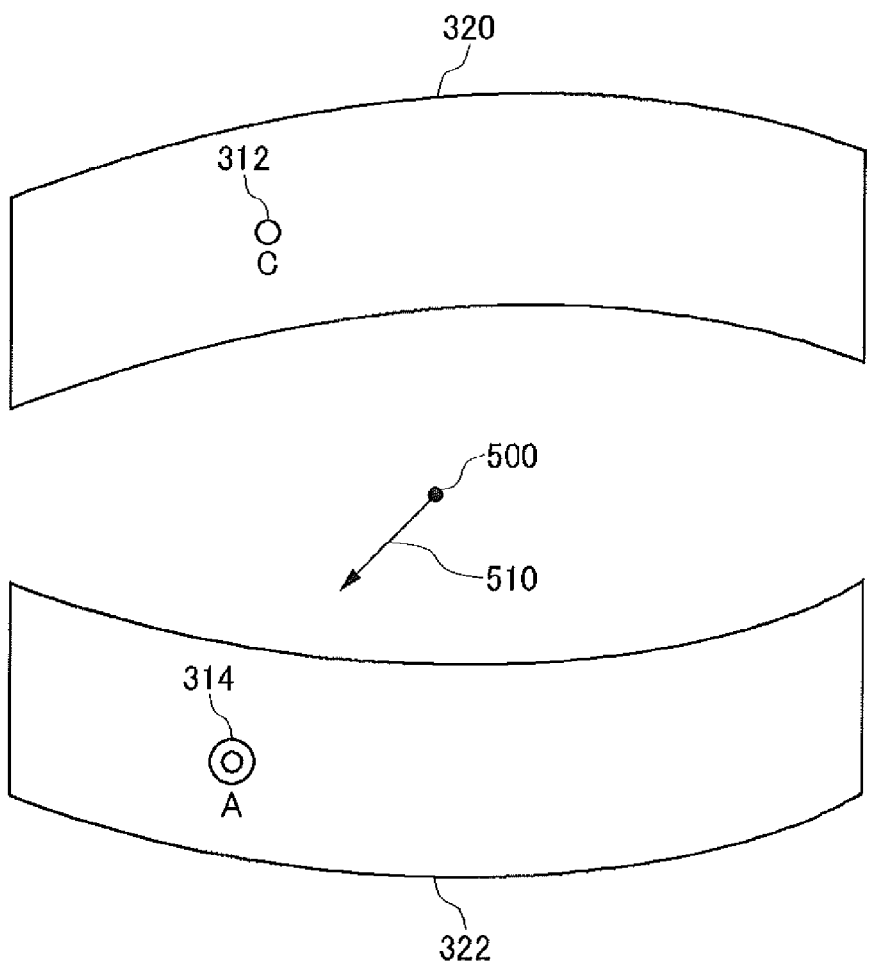
FIG. 15 is an illustration with which to explain an example of setting of a line of sight when a viewpoint is shifted from a given shooting point to another shooting point.

FIG. 15 is an illustration with which to explain another example of setting of the line of sight 510 when the viewpoint 500 is shifted from the shooting point A to the shooting point B. In this example, when the switching is made from the panoramic image 300 at the shooting point A to the panoramic image 320 at the shooting point B, the line of sight 510 of the user is set in the direction of looking back at the shooting point A from the shooting point B, namely, in the northwesterly direction. In this case, when the viewpoint 500 has shifted to the shooting point B, the user will see the panoramic image 322 in the back, instead of the panoramic image 320 in the front.

Since the marker 314 corresponding to the shooting point A is associated with the position of the northwesterly direction of the panoramic image 322 in the back, the user will see, right in front of his/her eyes when a shift is made to the shooting point B, the marker 314 for the shooting point A where he/she has been right up to the point. When a time-warp is made from the shooting point A to the shooting point B, the user can have a sense as if he/she is looking back at the shooting point A. Also, when the user wants to return to the shooting point A and view the panoramic image 300 at the shooting point A again, he/she can switch to the panoramic image 300 at the shooting point A by immediately selecting the marker 314 for the shooting point A, which is displayed right in front of his/her eyes.

A description is given of still another example of setting of the line of sight 510. Suppose that the panoramic image at a destination shooting point is not an omnidirectional image but an image within a range for a partial pan angle. If the line of sight 510 at the destination point is set in the direction looking at the destination point or looking back at the original point as described above, then there may be cases where no shot image is available in the direction of the panoramic image at the destination point. And in such a case a blank screen will be displayed. In order to avoid the blank screen, the initial line of sight 510 at the panoramic image of the destination may be set in the direction of pan angle 0° for the panoramic image of the destination. Or the line of sight 510 at the panoramic image of the destination may be set in a desired direction beforehand. The desired direction may be determined by the user or may be set automatically by a system side, for instance, in the line of sight or the like recommended for the panoramic image.

By employing the panoramic image display apparatus according to the present embodiments as described above, when there are a plurality of panoramic images at different shooting locations, panoramic images are associated with the shooting directions of a certain panoramic image in such a manner that the presence of the shooting locations of the other panoramic images can be visually confirmed. As a result, panoramic images can be switched for display as if a time-warp takes place from one shooting location to the other shooting location.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

The arrangement may be such that a preview of panoramic images is displayed on the screen that shows the symbols of panoramic images at the shooting points on a map as shown in FIG. 10 or FIG. 11. In the preview, for example, the panoramic images are only partially displayed in the form of thumb nail images, and then the panoramic images are shown in the entirety as the pan angle or the tilt angle is changed gradually within the thumb nail image frame. Also, while the preview of the panoramic images is being displayed, the direction of the pan angle may be shown by an arrow or the like indicating the bearing on a map.

In the foregoing description, a panoramic image associated with markers is mapped into a 3D panoramic space such as a spherical surface, and a 3D panoramic image when the 3D panoramic space is viewed in a specified line of sight is displayed on the screen. However, the panoramic image associated with markers may be simply displayed two-dimensionally. In this case, there is no need for construction of the mapping processing unit 14 and the 3D image generator 16, thus simplifying the panoramic image display apparatus 100. In this case, too, as the user selects a marker on the two-dimensionally displayed panoramic image, the panoramic image corresponding to the marker is switched on for display.

Panoramic images herein are not limited to ones shot by the omnidirectional image shooting system as shown in FIG. 3, but they may be ones shot through a fish-eye lens or ones synthesized from a plurality of images shot with a normal digital camera in different shooting directions.

In the foregoing description, the marker setting unit 12 maps the markers on the 3D panoramic space after the panoramic image before the integration of the markers has been mapped into the 3D panoramic space, so as to display the markers superposed on the 3D panoramic image. As another method for integrating markers into the panoramic image, the mapping processing unit 14 may integrate the markers into the panoramic image to be displayed and then perform a texture mapping of the panoramic image integrated with the markers into the 3D panoramic space. Either way, as long as the positions where the markers are to be displayed are associated with the panoramic image to be displayed, it is possible to integrate the markers into the panoramic image to be displayed at an arbitrary stage. Also, it is possible that all the markers are not integrated initially, but the markers to be integrated are selected for integration as appropriate. Also, when a newly shot panoramic image is registered in the panoramic image/additional data storage 24, the marker for the newly registered panoramic image may be added to the panoramic image already being displayed.

In the display of markers within a panoramic image, even if the shooting point A and the shooting point B are at the same latitude and the shooting point B is on the east of the shooting point A but the shooting point B is located in another country, then the display mode of the marker for the shooting point B may be changed. For example, the shape of the marker may be represented by the national flag of the country when the panoramic image shot in the country other than the country in which the panoramic image being displayed is shot is to be indicated by a marker. Also, when the shooting point B is located on the back side of the earth as viewed from the shooting point A, the marker for the shooting point B may be displayed at the bottom of the spherical panoramic image at the shooting point A.

EXPLANATION OF REFERENCE NUMERALS

10 Panoramic image acquiring unit
12 Marker setting unit

14 Mapping processing unit
16 3D image generator
18 Display control unit
20 Map generator
24 Panoramic image/additional data storage
26 Map data storage
30 Viewpoint position setting unit
32 Line-of-sight setting unit
34 Altitude setting unit
36 Date/time setting unit
38 Marker selector
40 User interface
100 Panoramic image display apparatus
200 Camera The present invention is used for apparatus and method for displaying panoramic images.

The invention claimed is:

1. A panoramic image display apparatus, comprising:
a storage configured to store panoramic images where information on shooting locations and shooting orientations are associated with each other;
an acquisition unit configured to acquire a first panoramic image to be displayed, from the storage;
a marker setting unit configured to associate a marker, indicating the presence and x, y, and z axis coordinates of a second panoramic image in a shooting direction, with the first panoramic image to be displayed, when the second panoramic image has a shooting location that is in the shooting direction of the first panoramic image to be displayed,
wherein the appearance of the marker is based on the proximity of the second panoramic image relative to the first panoramic image, such that the user can identify the distance between the first and second panoramic images based on the appearance of the marker, and a plurality of markers vary in appearance when the proximities associated with said markers are different;
a mapping processing unit configured to map the first panoramic image to be displayed, which is associated with the marker of the second panoramic image, into a three-dimensional (3D) panoramic space as a texture;
a three-dimensional (3D) image generator configured to generate a three-dimensional (3D) panoramic image, when the three-dimensional panoramic image mapped by the mapping processing unit is viewed in a specified line of sight in such a manner as to regard the shooting location of the first panoramic image to be displayed as a viewpoint position and such that the marker is displayed on said first panoramic image to be displayed at a point of said panoramic image corresponding to said shooting location of said second panoramic image;
a display control unit configured to display the three-dimensional panoramic image on a screen; and
an interface configured to receive an instruction from a user regarding the displayed three-dimensional panoramic image.

2. A panoramic image display apparatus according to claim 1, further comprising a map image generator configured to generate a map image in such a manner that a symbol indicating the presence of a panoramic image is set at a position of the Earth's surface corresponding to the shooting location,
wherein the display control unit displays the map image on the screen, and
wherein, when the interface receives an instruction to select the symbol of the panoramic image of the map image displayed, the interface sets a panoramic image corresponding to the selected symbol, to the first panoramic image to be displayed.

3. A panoramic image display apparatus according to claim 1, wherein the marker setting unit sets a different display mode for the marker of the second panoramic image associated with the first panoramic image to be displayed, according to the distance between the shooting location of the first panoramic image to be displayed and the shooting location of the second panoramic image.

4. A panoramic image display apparatus according to claim 1, wherein
the panoramic images stored in the storage are associated with their respective shooting altitudes,
the storage stores panoramic images shot at different altitudes at the same shooting location, and
when the interface receives an instruction to change the altitude, the interface sets a panoramic image, which has the same shooting location but corresponds to a specified location, to a new panoramic image to be displayed.

5. A panoramic image display apparatus according to claim 1, wherein
the panoramic images stored in the storage are associated with their respective shooting dates and times,
the storage stores panoramic images shot at different shooting dates and times at the same shooting location, and
when the interface receives an instruction to change the date and time, the interface sets a panoramic image, which has the same shooting location but corresponds to a specified date and time, to a new panoramic image to be displayed.

6. A panoramic image display apparatus according to claim 1, wherein, when the interface receives an instruction to select a marker in the 3D panoramic image, the interface sets another panoramic image corresponding to the selected marker to be a new panoramic image to be displayed in the place of the panoramic image having been viewed.

7. A panoramic image display apparatus according to claim 6, wherein,
when the another panoramic image corresponding to the selected marker is set as the new panoramic image to be displayed, the interface sets a shooting location of the new panoramic image to be displayed to a new viewpoint position,
the interface sets, to a new line of sight, a direction in which the shooting location of the new panoramic image to be displayed is viewed from a previous panoramic image, and
the 3D image generator generates a 3D panoramic image in a new line of sight, set by the interface, in which the 3D panoramic space is viewed from the new viewpoint position set by the interface.

8. A panoramic image display apparatus according to claim 6, wherein,
when the another panoramic image corresponding to the selected marker is set as the new panoramic image to be displayed, the interface sets a shooting location of the new panoramic image to be displayed to a new viewpoint position,
the interface sets, to a new line of sight, a direction in which a previous panoramic view is looked back at from the new panoramic image to be displayed, and
the 3D image generator generates a 3D panoramic image in the new line of sight, set by the interface, in which the 3D panoramic space is viewed from the new viewpoint position set by the interface.

9. A panoramic image display apparatus according to claim 1, wherein: the marker is displayed on said first panoramic image to be displayed at a point of said panoramic image corresponding to said shooting location of said second panoramic image.

10. A panoramic image display apparatus according to claim 9, wherein, when a user selects a marker in the first panoramic image to be displayed, the display control unit displays on the screen another panoramic image corresponding to the selected marker in the place of the first panoramic image to be displayed.

11. A method for displaying a panoramic image, comprising:
- reading, by a processor, a panoramic image at a shooting place as a first panoramic image to be displayed on a screen, from a storage device that stores a plurality of panoramic images where information on shooting locations and shooting orientations are associated with each other;
- associating, by the processor, a marker, that indicates the presence and x, y, and z axis coordinates of a second panoramic image in a shooting direction, with the first panoramic image to be displayed, when the second panoramic image has a shooting location that is in the shooting direction of the first panoramic image to be displayed, and displaying thereby, on the screen, the first panoramic to be displayed,
- wherein the appearance of the marker is based on the proximity of the second panoramic image relative to the first panoramic image, such that the user can identify the distance between the first and second panoramic images based on the appearance of the marker, and a plurality of markers vary in appearance when the proximities associated with said markers are different
- mapping the first panoramic image to be displayed, which is associated with the marker of the second panoramic image, into a three-dimensional (3D) panoramic space as a texture;
- generating a three-dimensional (3D) panoramic image, when the three-dimensional panoramic image is viewed in a specified line of sight in such a manner as to regard the shooting location of the first panoramic image to be displayed as a viewpoint position and such that the marker is displayed on said first panoramic image to be displayed at a point of said panoramic image corresponding to said shooting location of said second panoramic image;
- displaying said marker when displaying said first panoramic image on the screen; and
- receiving an instruction from a user regarding the displayed three-dimensional panoramic image.

12. A program embedded in a non-transitory computer-readable medium, the program comprising:
- an acquisition module operative to acquire a first panoramic image to be displayed, from a storage that stores panoramic images where information on shooting locations and shooting orientations are associated with each other;
- a marker setting module operative to associate a marker, indicating the presence and x, y, and z axis coordinates of a second panoramic image in a shooting direction, with the first panoramic image to be displayed, when there is a shooting location of the second panoramic image in the shooting direction of the first panoramic image to be displayed,
- wherein the appearance of the marker is based on the proximity of the second panoramic image relative to the first panoramic image, such that the user can identify the distance between the first and second panoramic images based on the appearance of the marker, and a plurality of markers vary in appearance when the proximities associated with said markers are different;
- a mapping module operative to map the first panoramic image to be displayed, together with the marker of the second panoramic image, into a three-dimensional (3D) panoramic space as a texture;
- a three-dimensional (3D) image generator module configured to generate a three-dimensional (3D) panoramic image, when the three-dimensional panoramic image is viewed in a specified line of sight in such a manner as to regard the shooting location of the first panoramic image to be displayed as a viewpoint position and such that the marker is displayed on said first panoramic image to be displayed at a point of said first panoramic image corresponding to said shooting location of said second panoramic image;
- a display control module configured to display the three-dimensional panoramic image on a screen; and
- an interface module configured to receive an instruction from a user regarding the displayed three-dimensional panoramic image.

13. A non-transitory computer-readable medium encoded with a program, which when executed by a computer, causes the computer to execute actions, comprising:
- reading a panoramic image at a shooting place as a first panoramic image to be displayed on a screen, from a storage device that stores a plurality of panoramic images where information on shooting locations and shooting orientations are associated with each other;
- associating, by the processor, a marker, that indicates the presence and x, y, and z axis coordinates of a second panoramic image in a shooting direction, with the first panoramic image to be displayed, when the second panoramic image has a shooting location that is in the shooting direction of the first panoramic image to be displayed, and displaying thereby, on the screen, the first panoramic to be displayed,
- wherein the appearance of the marker is based on the proximity of the second panoramic image relative to the first panoramic image, such that the user can identify the distance between the first and second panoramic images based on the appearance of the marker, and a plurality of markers vary in appearance when the proximities associated with said markers are different
- mapping the first panoramic image to be displayed, which is associated with the marker of the second panoramic image, into a three-dimensional (3D) panoramic space as a texture;
- generating a three-dimensional (3D) panoramic image, when the three-dimensional panoramic image is viewed in a specified line of sight in such a manner as to regard the shooting location of the first panoramic image to be displayed as a viewpoint position and such that the marker is displayed on said first panoramic image to be displayed at a point of said panoramic image corresponding to said shooting location of said second panoramic image;
- displaying said marker when displaying said first panoramic image on the screen; and
- receiving an instruction from a user regarding the displayed three-dimensional panoramic image.

* * * * *